United States Patent
Shibata et al.

(10) Patent No.: US 10,135,382 B2
(45) Date of Patent: Nov. 20, 2018

(54) MOTOR CONTROL DEVICE

(71) Applicant: OKUMA Corporation, Niwa-gun, Aichi (JP)

(72) Inventors: Tomohiro Shibata, Aichi (JP); Yoshimaro Hanaki, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 27 days.

(21) Appl. No.: 15/388,377

(22) Filed: Dec. 22, 2016

(65) Prior Publication Data

US 2017/0179867 A1 Jun. 22, 2017

(30) Foreign Application Priority Data

Dec. 22, 2015 (JP) ................................ 2015-250333

(51) Int. Cl.
*H02P 29/032* (2016.01)
*H02P 21/22* (2016.01)
*H02P 27/06* (2006.01)
*H02P 29/024* (2016.01)

(52) U.S. Cl.
CPC ............ *H02P 29/032* (2016.02); *H02P 21/22* (2016.02); *H02P 27/06* (2013.01); *H02P 29/024* (2013.01)

(58) Field of Classification Search
CPC ......... H02P 29/032; H02P 21/22; H02P 27/06
USPC .............................................. 318/400, 400.2
See application file for complete search history.

(56) References Cited

U.S. PATENT DOCUMENTS

| | | | | |
|---|---|---|---|---|
| 6,700,400 B2* | 3/2004 | Atarashi | ............ | B60L 11/1803 318/400.01 |
| 6,707,265 B2* | 3/2004 | Imai | ....................... | H02P 6/185 318/400.02 |
| 7,843,160 B2* | 11/2010 | Sasaki | .................... | B62D 5/046 318/400.15 |
| 8,018,185 B2* | 9/2011 | Yamamoto | ............ | B60L 15/025 318/400.02 |
| 8,569,986 B2* | 10/2013 | Tseng | .................... | G01R 31/343 318/139 |
| 8,643,316 B2* | 2/2014 | Kono | .................... | B60L 3/0023 318/139 |
| 8,686,672 B2* | 4/2014 | Suzuki | .................. | B62D 5/046 318/400.02 |
| 8,975,847 B2* | 3/2015 | Kono | ...................... | H02M 1/36 180/65.275 |
| 9,018,870 B2* | 4/2015 | Kobayashi | ............... | B60K 6/48 318/400.02 |
| 9,310,798 B2* | 4/2016 | Nagata | ..................... | G05B 6/02 |

(Continued)

FOREIGN PATENT DOCUMENTS

JP 2009118689 A 5/2009

*Primary Examiner* — Eduardo Colon Santana
*Assistant Examiner* — Devon Joseph
(74) *Attorney, Agent, or Firm* — Cantor Colburn LLP

(57) ABSTRACT

A motor control device calculates a velocity difference based on a velocity command and a velocity detection value of a motor and an excitation current common phase voltage difference based on an excitation current command value and an excitation current detection value, and judges that demagnetization occurs when the following conditions are all met: the excitation current common phase voltage difference exceeds a voltage threshold; the velocity difference exceeds a velocity threshold; and acceleration is being performed.

2 Claims, 4 Drawing Sheets

(56) References Cited

U.S. PATENT DOCUMENTS

| | | | | |
|---|---|---|---|---|
| 2004/0212333 A1* | 10/2004 | Ohtachi | ................... | H02P 6/10 318/400.15 |
| 2008/0036415 A1* | 2/2008 | Kaizuka | ............. | H02P 21/0003 318/730 |
| 2008/0100244 A1* | 5/2008 | Amagasa | ................. | B60S 1/08 318/434 |

* cited by examiner

MOTOR CONTROL DEVICE

CROSS REFERENCE TO RELATED APPLICATION

The entire disclosure of Japanese Patent Application No. 2015-250333 filed on Dec. 22, 2015 including the specification, claims, drawings, and abstract is incorporated herein by reference in its entirety.

TECHNICAL FIELD

The present application relates to a motor control device for a feed shaft including both a linear shaft and a rotary shaft in a machining tool or the like.

BACKGROUND

Motors using a permanent magnet, such as a brushless DC motor used to move a feed shaft of a machining tool, etc. require a high output and a high-speed response and also need to maintain quality. In particular, machining tools and the like are often used in rough environments. Therefore, conventionally, in order to cope with insulation deterioration, etc. due to aging, various attempts have been made to detect abnormality in a motor before the motor fails completely; namely, at an initial stage of a failure.

FIG. 4 and FIG. 5 are block diagrams showing conventional control. Regarding a control object in which a table 141 is operated by a motor 14 via a ball screw 142, a current detection value calculation unit 16 outputs an excitation current detection value Idd and a torque current detection value Iqd that are two-phase current detection values, based on u-phase current Iu detected by a u-phase current detector 12, v-phase current Iv detected by a v-phase current detector 13, and a positional detection value Pd detected by a position detector 15 mounted on the motor 14. A differentiator 17 differentiates the positional detection value Pd and outputs a velocity detection value Vdet of the motor. A subtractor 2 calculates a difference between a velocity command Vc and the velocity detection value Vdet, and outputs the result as a velocity difference Vdif. A current command computation unit 3 outputs, based on the velocity difference Vdif, an excitation current command value Idc, and a torque current command value Iqc that are two-phase current command values. A subtractor 4 calculates a difference between the excitation current command value Idc and the excitation current detection value Idd, and outputs the result as an excitation current difference. A d-axis voltage difference computation unit 5 outputs an excitation current common phase voltage difference ΔVdc based on the excitation current difference, a proportional gain Kp, and an integration gain Ki. A subtractor 6 calculates a difference between the torque current command value Iqc and the torque current detection value Iqd, and outputs the result as a torque current difference. A q-axis voltage difference computation unit 7 outputs a torque current common phase voltage difference ΔVqc based on the torque current difference, a proportional gain Kp, and an integration gain Ki. A voltage feed forward value computation unit 8 outputs an excitation current common phase voltage feed forward value Vdff and a torque current common phase voltage feed forward value Vqff, based on the velocity detection value Vdet, the excitation current command value Idc, and the torque current command value Iqc. An adder 9 outputs an excitation current common phase voltage command Vdc based on the excitation current common phase voltage feed forward value Vdff and the excitation current common phase voltage difference ΔVdc, and an adder 10 outputs a torque current common phase voltage command Vqc based on the torque current common phase voltage feed forward value Vqff and the torque current common phase voltage difference ΔVqc. An inverter 11 outputs three-phase, u, v, and w-phase, currents based on the excitation current common phase voltage command Vdc, the torque current common phase voltage command Vqc, and the positional detection value Pd. The excitation current common phase voltage difference ΔVdc calculated in the d-axis voltage difference computation unit 5 and the torque current common phase voltage difference ΔVqc calculated in the q-axis voltage difference computation unit 7 are input to a voltage difference detector 18.

The voltage difference detector 18 detects whether or not the motor is in an abnormal state. If it judges that the motor is in an abnormal state, it outputs a signal W1 indicating that state. The voltage difference detector 18 judges that the motor is in an abnormal state and outputs the signal W1 in any of the following cases: the size of the excitation current common phase voltage difference ΔVdc exceeds a preset threshold Ref1; the size of an output of a first-order lag circuit 183 that receives, as an input, the excitation current common phase voltage difference ΔVdc, exceeds a preset threshold Ref2; the size of the torque current common phase voltage difference ΔVqc exceeds a preset threshold Ref3; and the size of an output of a first-order lag circuit 188 that receives, as an input, the torque current common phase voltage difference ΔVqc, exceeds a preset threshold Ref4. Upon receipt of the signal W1, a host control device judges that the motor is in an abnormal state, and stops the motor promptly.

Here, the principle that enables a motor abnormality to be detected based on an excitation current common phase voltage difference ΔVdc or a torque current common phase voltage difference ΔVqc will be explained briefly. In the case of a brushless DC motor, assuming that a coil resistance is R, an inductance value is L, the electrical angular frequency is we, the motor velocity is w, and that an induced voltage constant is Ke, voltage equations for an excitation current common phase voltage theoretical value Vd and a torque current common phase voltage theoretical value Vq are typically expressed as (Equation 1) and (Equation 2).

$$Vd = R \times Id + \omega e \times L \times Iq \quad \text{(Equation 1)}$$

$$Vq = R \times Iq - \omega e \times L \times Id + \omega \times Ke \quad \text{(Equation 2)}$$

If the motor is manufactured such that a constant of the motor is provided almost as theoretically given, and if Vd calculated in (Equation 1) is output as the excitation current common phase voltage feed forward value Vdff, and Vq calculated in (Equation 2) is output as the torque current common phase voltage feed forward value Vqff, the inverter unit 11 outputs three-phase, u, v, and w-phase currents having the same values as their theoretical values. As a result, because the excitation current command value Idc becomes equal to the excitation current detection value Idd, an output ΔVdc of the d-axis voltage difference computation unit 5 becomes zero. Further, because the torque current command value Iqc becomes equal to the torque current detection value Iqd, an output ΔVqc of the q-axis voltage difference computation unit 7 becomes zero. However, if the coil resistance, the inductance value, and the induced voltage constant are shifted from their theoretical values due to manufacturing defects, etc., an excitation current common phase voltage difference ΔVdc and a torque current common phase voltage difference ΔVqc are generated. That is, in the abnormal state where the coil resistance, the inductance value, and the induced voltage constant largely differ from their theoretical values, the excitation current common phase voltage difference ΔVdc and the torque current common phase voltage difference ΔVqc are also large, and therefore, the presence of abnormality in the motor can be detected by monitoring these values, ΔVdc and ΔVqc, using the voltage difference detector 18.

Further, if the current commands are changed suddenly, large differences ΔVdc and ΔVqc may be generated for an instant due to control delay, etc., depending on a constant of the motor, and abnormality in the motor may be erroneously detected. In that case, the presence of abnormality in the motor may be detected based on an output of the first-order lag circuit for ΔVdc and an output of the first order lag circuit for ΔVqc.

Here, such abnormality detection includes two types of false detections: "excessive detection" that erroneously detects normality as "abnormality"; and "abnormality ignoring" that erroneously detects "normality" in spite of occurrence of abnormality. In the conventional technology shown in FIG. 4 and FIG. 5, in order to prevent "excessive detection," the thresholds Ref1, Ref2, Ref3, and Ref4 and constants of the first-order lag circuits 183 and 188 need to be set to be greater than their theoretical values, which may cause difficulty in detecting abnormality. However, demagnetization, which is one of motor failure modes, tends to be generated when the motor generates heat due to machine collision or an overload state, or when unintended current flows due to failure of an inverter, etc. Meanwhile, as described above, if the various constants are set to be greater than their theoretical values, there is the problem that abnormality detection can be detected only after the motor is accelerated to a certain extent. As a result, in the demagnetized state, abnormality in the motor can be detected only after the table 141 is accelerated and subsequently achieves a target velocity, and thus, detection of the demagnetized state is delayed. Here, there is a possibility that, in the demagnetized state, a desired deceleration torque cannot be output at deceleration, and the table 141 overshoots a target position and causes machine collision, etc. That is, if the values of thresholds Ref1, Ref2, Ref3, and Ref4 are increased to prevent excessive detection, abnormality ignoring that cannot detect demagnetization at a necessary time is caused. In addition, conversely, if the values of thresholds Ref1, Ref2, Ref3, and Ref4 are reduced, there is another problem that excessive detection that erroneously detects occurrence of demagnetization is caused frequently, in spite of the absence of occurrence demagnetization. Accordingly, the present application discloses a motor control device that can improve the detection accuracy of demagnetization.

SUMMARY

The present application discloses a motor control device for controlling a motor driven by three-phase alternating currents converted from a direct current power supply. The motor control device includes a current command computation unit that outputs a torque current command value and an excitation current command value, based on a velocity difference that is a difference between a velocity command and a velocity detection value of the motor; a current detection value computation unit that calculates a torque current detection value and an excitation current detection value from three-phase current detection values of the motor; a d-axis voltage difference calculation unit that calculates an excitation current common phase voltage difference that is in the same phase as an excitation current, based on the excitation current command value and the excitation current detection value; a q-axis voltage difference calculation unit that calculates a torque current common phase voltage difference that is in the same phase as a torque current, based on the torque current command value and the torque current detection value; a d-axis voltage command calculation unit that calculates an excitation current common phase voltage command that is in the same phase with the excitation current, based on the excitation current common phase voltage difference and an excitation current common phase voltage feed forward value; a q-axis voltage command calculation unit that calculates a torque current common phase voltage command that is in the same phase with the torque current, based on the torque current common phase voltage difference and a torque current common phase voltage feed forward value; and an inverter unit that outputs three-phase currents to the motor, based on the torque current common phase voltage command, the excitation current common phase voltage command, and a position detection value of the motor. In the motor control device, it is judged that demagnetization occurs when all the following conditions are met: at least one of the excitation current common phase voltage difference, the torque current common phase voltage difference, and output values of their first-order lag circuits exceeds a preset, corresponding threshold; a difference between the velocity command and the velocity detection value exceeds a preset threshold; and acceleration is being performed.

With the motor control device disclosed in the present application, it is possible to detect occurrence of demagnetization with high accuracy, and stop the motor promptly and safely.

BRIEF DESCRIPTION OF DRAWINGS

Embodiment of the present disclosure will be described by reference to the following figures, wherein.

DESCRIPTION OF EMBODIMENTS

Figure 1:
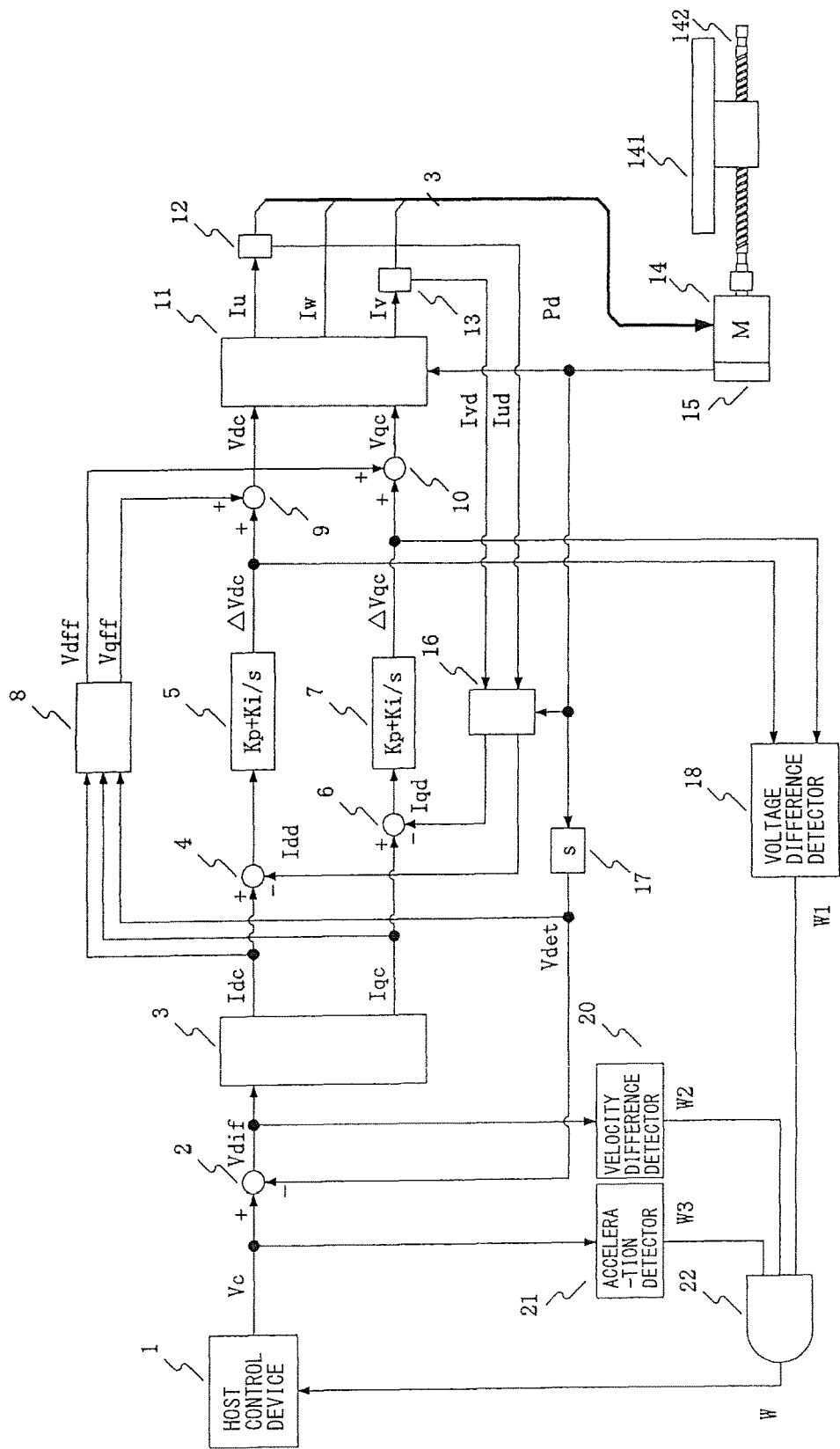
FIG. 1 is a block diagram showing an embodiment.
Figure 2:
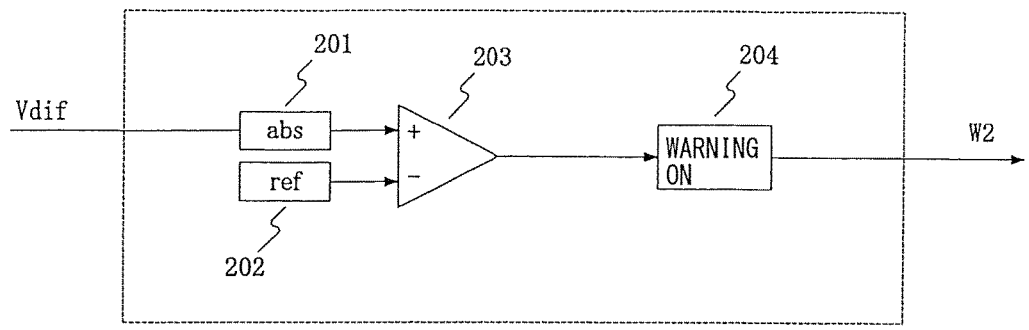
FIG. 2 is a block diagram showing an example of a velocity difference detector.
Figure 4:
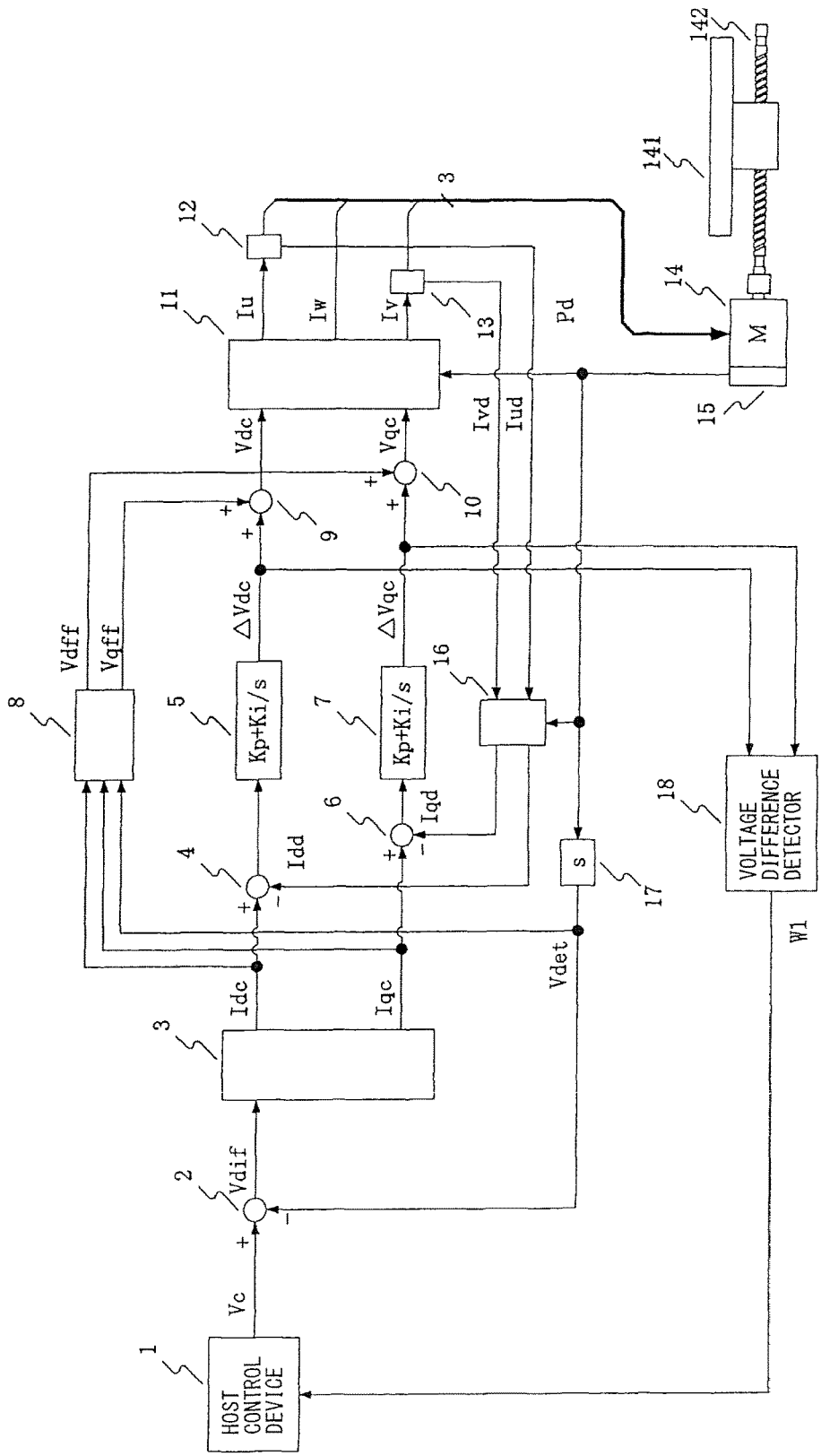
FIG. 4 is a block diagram showing a prior art technology.

Embodiments will be explained. Components that are the same as those in the prior art example are assigned the same reference numerals, and their detailed description will be omitted. FIG. 1 and FIG. 2 show block diagrams of a motor control device of the present invention. Like the motor control device exemplified in FIG. 4, the motor control device of the present invention also outputs two-phase current command values Idc and Iqc based on a velocity difference Vdif, performs proportional integration on differences (current differences) between the current command values Idc and Iqc and current feedback values Idd and Iqd, and outputs two-phase voltage differences ΔVdc and ΔVqc. In addition, the motor control device also calculates two-phase voltage feed forward values Vdff and Vqff based on the two-phase current command values Idc and Iqc and a velocity detection value Vdet of the motor 14. Then, the motor control device respectively adds the voltage feed forward values Vdff and Vqff to the voltage differences ΔVdc and ΔVqc in the same phases, to thereby calculate two-phase voltage command values Vdc and Vqc. In this case, adders 9 and 10 function as a d-axis voltage command calculation unit and a q-axis voltage command calculation unit, respectively. An inverter unit 11 outputs three-phase currents Iu, Iw, and Iv based on the two-phase voltage command values Vdc and Vqc and a position detection value from a motor 14.

Figure 5:
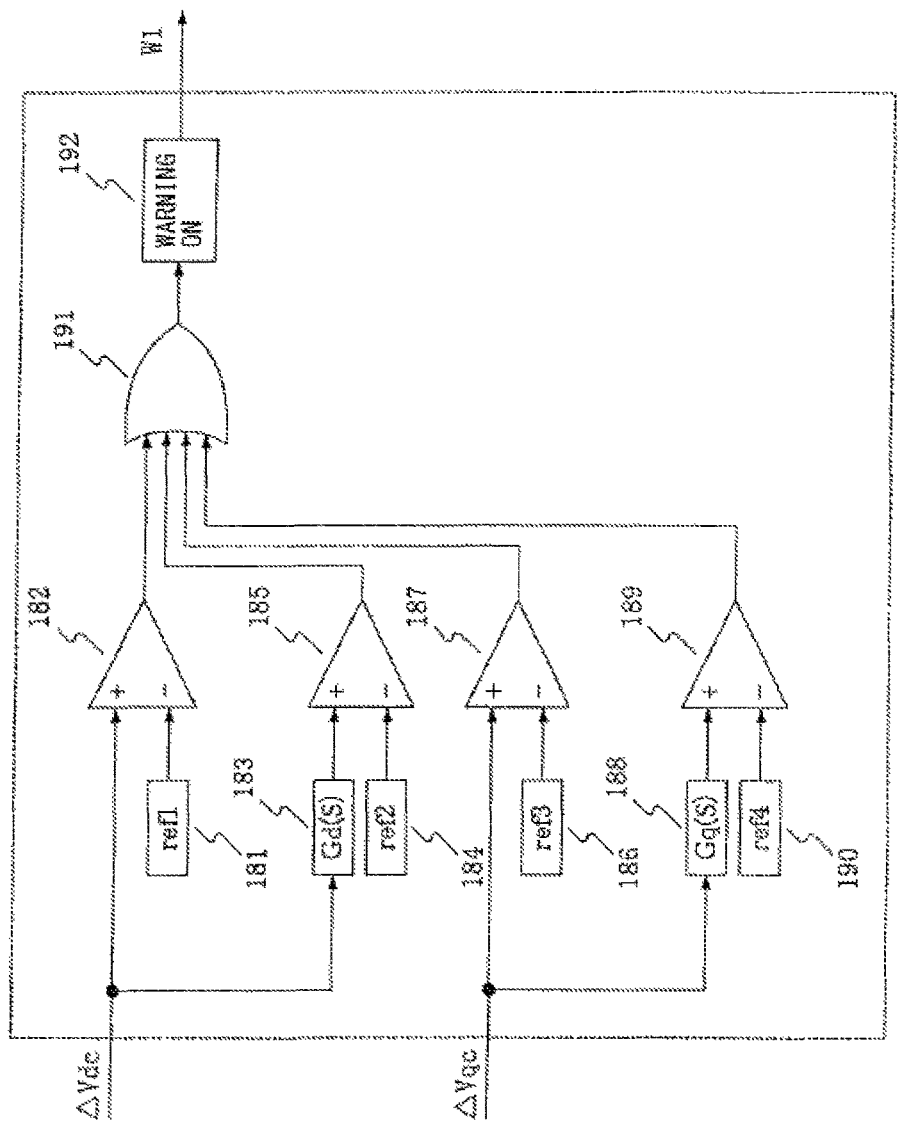
FIG. 5 is a diagram showing an example of a voltage difference detector.

Such a motor control device has a voltage difference detector 18, a velocity difference detector 20, and an acceleration detector 21, in order to detect the presence of demagnetization of the motor 14. The voltage difference detector 18 has a structure as shown in FIG. 5. More specifically, the voltage difference detector 18 has four comparators 182, 185, 187, and 189, an OR circuit 191, and a state indicator 192. The comparator 182 compares the excitation current common phase voltage difference ΔVdc with a threshold ref1, and outputs "1" if the excitation current common phase voltage difference ΔVdc is greater. The comparator 185 compares a first-order lag circuit output value of the excitation current common phase voltage difference ΔVdc with a threshold ref2, and outputs "1" if the first-order lag circuit output value is greater. The comparator 187 compares the torque current common phase voltage difference ΔVqc with a threshold ref3, and outputs "1" if the torque current common phase voltage difference ΔVqc is greater. The comparator 189 compares a first-order lag circuit output value of the torque current common phase voltage difference ΔVqc with a threshold ref4, and outputs "1" if the first-order lag circuit output value is greater.

If at least one of the four comparators 182, 185, 187, and 189 outputs "1," the OR circuit 191 instructs the state indicator 192 to output a signal. The state indicator 192 outputs a signal W1 upon receipt of an instruction. That is, if at least one of the excitation current common phase voltage difference ΔVdc, the torque current common phase voltage difference ΔVqc, and their first-order lag circuit output values is greater than a corresponding threshold ref1, ref2, ref3, or ref4, the voltage difference detector 18 outputs the signal W1 indicating that state.

If the size of the velocity difference Vdif exceeds a preset threshold Ref, the velocity difference detector 20 outputs a signal W2 indicating that state. FIG. 2 is a block diagram showing an example of the velocity difference detector 20. This velocity difference detector 20 has a comparator 203 and a state indicator 204. The comparator 203 receives, as inputs, an absolute value of the velocity difference Vdif (output value of an absolute value obtaining unit 201) and the preset threshold Ref. If the velocity difference Vdif is greater, the comparator 203 instructs the state indicator 204 to output a signal. The state indicator 204 outputs a signal W2 upon receipt of an instruction. Here, the velocity difference Vdif is a parameter that increases when demagnetization occurs. Namely, when demagnetization occurs, an output torque from the motor 14 is reduced, desired acceleration cannot be obtained. Therefore, the velocity detection value Vdet of the motor is not a desired velocity. As a result, when demagnetization occurs, the velocity difference Vdif increases.

The acceleration detector 21 detects whether or not acceleration is being performed from the velocity command Vc, and outputs a signal W3 indicating that state. An AND circuit 22 performs AND calculation based on the signals W1, W2, and W3, and outputs a signal W indicating that state. Namely, the AND circuit 22 outputs the signal W only when all of the signals W1, W2, and W3 are input. When the host control device receives the signal W as an input, it judges that demagnetization is occurring in the motor, and stops the motor promptly. In other words, the host control device judges that demagnetization occurs if all the following conditions are met: acceleration is being performed; the voltage difference (ΔVdc, ΔVqc, or their first-order lag circuit output values) is large; and the velocity difference Vdif is large.

Thus, three elements of the voltage differences, the velocity difference, and the presence of acceleration are monitored, in order to reduce false detections of demagnetization and improve the detection accuracy of demagnetization. Here, the false detections include "abnormality ignoring" that erroneously detects "normality" in spite of occurrence of abnormality, and "excessive detection" that erroneously detects normality as "occurrence of demagnetization."

In the present embodiment, in order to reduce "abnormality ignoring," values of the thresholds ref1, ref2, ref3, ref4, and Ref to be compared with the voltage differences (ΔVdc, ΔVqc, or their first-order lag circuit output values) and the velocity difference Vdif are relatively small theoretical values. Here, the theoretical values are difference values that are caused by variations in characteristic values even among normal motors due to individual differences among motors, and control delay. For example, as already described, the voltage command theoretical values for the d-axis and q-axis can be calculated according to Equation 1 and Equation 2. The values of the coil resistance R, the inductance L, and the induced voltage constant Ke used in Equation 1 and Equation 2 take constant values without considering individual differences among motors. On the other hand, values of the coil resistance R, the inductance L, and the induced voltage constant Ke of a motor vary in reality, even if the motor is normal. Due to such variations in characteristic values for each motor and control delay, the voltage differences ΔVdc and ΔVqc become greater than 0. In the present embodiment, values of voltage differences ΔVdc and ΔVqc caused by variations in characteristics values, which may be generated even among normal motors, and values of the voltage differences ΔVdc and ΔVqc caused by control delay are summed, respectively, and the summed values (theoretical values) are set as the thresholds ref1, ref2, ref3, and ref4. Such theoretical values can be obtained by conducting experiments, etc. in advance.

Similarly, a value of a velocity difference caused by variations in characteristic values (inertia and torque), which may be generated even among normal motors, and a value of a velocity difference caused by control delay are summed, and the summed value (theoretical value) is set as the threshold Ref. This theoretical value for the threshold Ref can also be obtained by conducting experiments, etc. in advance.

If the values of the thresholds ref1, ref2, ref3, ref4, and Ref to be compared are reduced, "abnormality ignoring" can be reduced, but "excessive detection" that recognizes normality as "occurrence of demagnetization" occurs. In the present embodiment, in order to prevent this "excessive detection," "occurrence of demagnetization" is judged only when both W1 and W2 are output. The reasons are as follows.

Although both voltage differences ΔVdc and ΔVqc and the velocity difference Vdif increase when demagnetization occurs, they are basically uncorrelated parameters. For example, the voltage differences ΔVdc and ΔVqc increase not only when demagnetization occurs but also when the coil resistance R or the inductance L changes due to an open circuit, a motor interphase short circuit, etc., and when a torque such as a cutting impact torque increases drastically and a current command changes suddenly. On the other hand, the velocity difference Vdif does not particularly increase in these occasions. Further, the velocity difference Vdif increases when the cutting load increases. On the other hand, the voltage differences ΔVdc and ΔVqc do not particularly increase in such a case, even if the cutting load is large.

Therefore, if the presence of demagnetization is judged based on the voltage differences ΔVdc and ΔVqc alone, there is a risk that occurrence of an open circuit, a motor interphase short circuit, or a sudden change in a current command is erroneously detected as occurrence of "demagnetization" (excessive detection). On the other hand, if the presence of demagnetization is judged based on the velocity difference Vdif alone, there is a risk that occurrence of "demagnetization" (excessive detection) is erroneously detected when the cutting load increases gradually. Although there is no correlation between the voltage differences ΔVdc and ΔVqc and the velocity difference Vdif, in the present embodiment, excessive detection can be prevented effectively by monitoring the two types of parameters that increase in demagnetization. In addition, because excessive detection can be prevented effectively, the values of the thresholds Ref, ref1, ref2, ref3, ref3, and ref4 used in judging the presence of demagnetization can be reduced, thereby reducing "abnormality ignoring" which misses abnormality.

If the cutting load is large after a drastic impact torque occurs due to start of cutting, both voltage differences ΔVdc and ΔVqc and velocity difference Vdif increase, even if no demagnetization occurs. In this case, there is a risk of "excessive detection" that erroneously judges that demagnetization occurs immediately after cutting, in spite of the absence of occurrence of demagnetization. Typically, before cutting, a machine tool often performs approaching operation until a cutting point in a fast forward manner. The approaching operation inevitably has accelerating operation at the beginning. The above-described false detection (excessive detection) that occurs immediately after cutting can be prevented by judging the presence of demagnetization only during this accelerating operation, but not during cutting.

Further, if demagnetization occurs, an overshoot becomes larger while the fast forwarding speed is decelerated, and great damage may be caused by machine collision. Therefore, when demagnetization occurs, it is preferable to detect a motor failure before deceleration starts, and stop the motor promptly. By judging the presence of demagnetization during acceleration, it is possible to stop the motor before deceleration starts even if there is occurrence of demagnetization, thereby effectively preventing the problem that the machine overruns a target position and collides against other parts.

As is clear from the description above, in the present embodiment, "excessive detection" that erroneously detects occurrence of demagnetization in spite of the absence of occurrence of demagnetization can be effectively prevented by outputting the signal W indicating occurrence of demagnetization if all the following conditions are met: the voltage difference ΔVdc or ΔVqc is large; the velocity difference Vdif is large; and acceleration is being performed. In addition, because it is possible to prevent excessive detection, the thresholds Ref, ref1, ref2, ref3, and ref4 can be reduced, and "abnormality ignoring" that erroneously detects occurrence of demagnetization as "normality" can be prevented. Then, because it is possible to prevent abnormality ignoring, demagnetization can be found early, and the motor can be stopped quickly. As a result, the problems, such as collision of the machine against other parts, can be prevented effectively.

Figure 3:
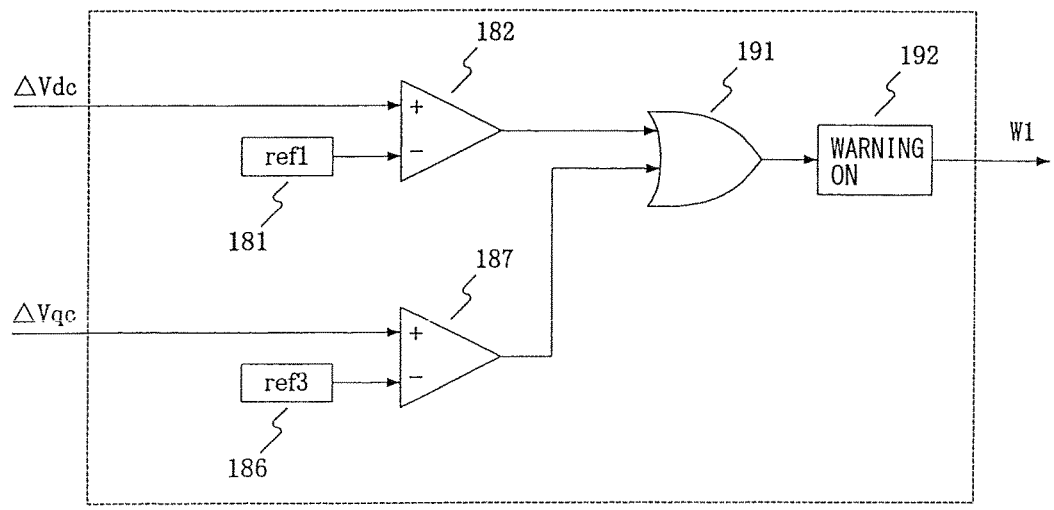
FIG. 3 is a block diagram showing another example of a voltage difference detector.

Next, another embodiment will be described. FIG. 3 is a block diagram of another embodiment of the voltage difference detector 18 of the motor control device. When the size of the excitation current common phase voltage difference ΔVdc exceeds the preset threshold ref1, or when the size of the torque current common phase voltage difference ΔVqc exceeds the preset threshold ref3, this voltage difference detector 18 detects that the motor is in an abnormal state, and outputs that state W1. In other words, in this embodiment, the first-order lag circuit output values of the voltage differences ΔVdc and ΔVqc are not monitored. This is because the velocity difference detector 20 and the acceleration detector 21 serve to reduce the possibility of erroneous detection of demagnetization, and thus, compared to the conventional examples, abnormality in the motor, such as demagnetization, can be detected with higher accuracy even without the first-order lag circuit.

The invention claimed is:
1. A motor control device for controlling a motor driven by three-phase alternating currents converted from a direct current power supply, the motor control device comprising:
a current command computation unit that outputs a torque current command value and an excitation current command value, based on a velocity difference that is a difference between a velocity command and a velocity detection value of the motor;
a current detection value computation unit that calculates a torque current detection value and an excitation current detection value from three-phase current detection values of the motor;
a d-axis voltage difference calculation unit that calculates an excitation current common phase voltage difference that is in the same phase as an excitation current, based on the excitation current command value and the excitation current detection value;
a q-axis voltage difference calculation unit that calculates a torque current common phase voltage difference that is in the same phase as a torque current, based on the torque current command value and the torque current detection value;
a d-axis voltage command calculation unit that calculates an excitation current common phase voltage command that is in the same phase with the excitation current, based on the excitation current common phase voltage difference and an excitation current common phase voltage feed forward value;
a q-axis voltage command calculation unit that calculates a torque current common phase voltage command that is in the same phase with the torque current, based on the torque current common phase voltage difference and a torque current common phase voltage feed forward value;
an inverter unit that outputs three-phase currents to the motor, based on the torque current common phase voltage command, the excitation current common phase voltage command, and a position detection value of the motor;
a voltage difference detector outputting a signal based on the excitation current common phase voltage difference and the torque current common phase voltage difference;
a velocity difference detector outputting a signal based on the velocity difference;

an acceleration detector that outputs a signal based on whether or not acceleration is being performed; and an AND circuit that performs AND calculations based on the signals outputted by the voltage difference detector, velocity difference detector and the acceleration detector;

wherein it is judged that demagnetization occurs when all the following conditions are met: at least one of the excitation current common phase voltage difference, the torque current common phase voltage difference, and output values of their first-order lag circuits exceeds a preset, corresponding voltage threshold; the velocity difference exceeds a preset velocity threshold; and acceleration is being performed;

wherein the voltage threshold is a sum of a voltage difference caused by variations in characteristic values generated in normal motors and a voltage difference caused by control delay.

2. A motor control device for controlling a motor driven by three-phase alternating currents converted from a direct current power supply, the motor control device comprising:

a current command computation unit that outputs a torque current command value and an excitation current command value, based on a velocity difference that is a difference between a velocity command and a velocity detection value of the motor;

a current detection value computation unit that calculates a torque current detection value and an excitation current detection value from three-phase current detection values of the motor;

a d-axis voltage difference calculation unit that calculates an excitation current common phase voltage difference that is in the same phase as an excitation current, based on the excitation current command value and the excitation current detection value;

a q-axis voltage difference calculation unit that calculates a torque current common phase voltage difference that is in the same phase as a torque current, based on the torque current command value and the torque current detection value;

a d-axis voltage command calculation unit that calculates an excitation current common phase voltage command that is in the same phase with the excitation current, based on the excitation current common phase voltage difference and an excitation current common phase voltage feed forward value;

a q-axis voltage command calculation unit that calculates a torque current common phase voltage command that is in the same phase with the torque current, based on the torque current common phase voltage difference and a torque current common phase voltage feed forward value;

an inverter unit that outputs three-phase currents to the motor, based on the torque current common phase voltage command, the excitation current common phase voltage command, and a position detection value of the motor;

a voltage difference detector outputting a signal based on the excitation current common phase voltage difference and the torque current common phase voltage difference;

a velocity difference detector outputting a signal based on the velocity difference;

an acceleration detector that outputs a signal based on whether or not acceleration is being performed; and an AND circuit that performs AND calculations based on the signals outputted by the voltage difference detector, velocity difference detector and the acceleration detector;

wherein it is judged that demagnetization occurs when all the following conditions are met: at least one of the excitation current common phase voltage difference, the torque current common phase voltage difference, and output values of their first-order lag circuits exceeds a preset, corresponding voltage threshold; the velocity difference exceeds a preset velocity threshold; and acceleration is being performed;

wherein the velocity threshold is a sum of a velocity difference caused by variations in characteristic values generated in normal motors and a velocity difference caused by control delay.

\* \* \* \* \*